United States Patent Office 3,081,232
Patented Mar. 12, 1963

3,081,232
IODINE PREPARATION AND METHOD OF DISINFECTING THE SKIN
Donald H. Powers, Boston, Mass., and Martin M. Rieger, West Engelwood, N.J., assignors to Warner-Lambert Pharmaceutical Company, Morris Plains, N.J., a corporation of Delaware
No Drawing. Filed Dec. 27, 1960, Ser. No. 78,248
14 Claims. (Cl. 167—70)

This invention relates to iodine preparations and relates more particularly to new and novel nonstaining and non-irritating compositions comprising iodine which are capable not only of inhibiting the growth of bacteria in relatively low iodine concentrations but of maintaining their effectiveness for prolonged periods.

This invention also relates to a new and novel method of disinfecting the skin.

Iodine is one of the most efficient antiseptics known and has been used by the medical profession for over 100 years. There are, however, several problems inherent in the use of iodine as an antiseptic. Iodine is a volatile material and is too slightly soluble in water to yield an effective antiseptic solution. To obtain a solution of iodine which contains sufficient iodine to be effectively used as an antiseptic, iodine and an iodide salt such as potassium iodide are dissolved in aqueous alcohol to form the well-known tincture of iodine. Diatomic iodine ($I_2$) in the presence of water and of a soluble iodide salt forms significant proportions of the triiodide ion ($I_3^-$) which is devoid of antiseptic activity. Thus, large amounts of iodine must be incorporated in the solution to insure the presence of sufficient antiseptic diatomic iodine. Unfortunately, the application of iodine in this form produces a rather unsightly staining of the skin. In addition, the bactericidal activity of tincture of iodine persists for a period of only comparatively short duration (of the order of eight hours) with the result that for continued antiseptic activity repeated applications are required. Tincture of iodine is recognized as causing an unpleasant stinging or burning sensation when applied to tissues. Moreover, as the result of repeated contact with iodine and with the alcohol commonly used as a portion of the carrier in forming tincture of iodine, tissue damage may well arise.

Considerable efforts have been directed towards the discovery of substances which can be used as carriers of iodine to reduce the undesirable side effects occasioned by use of tincture of iodine. A number of preparations have been made wherein iodine is chemically complexed with a carrier and wherein the resulting preparation in contact with water liberates iodine from the complex in an effective antiseptic form; such chemical complexes are commonly referred to as iodophors. Although such iodine complexes represent some improvement over tincture of iodine, they still present the disadvantage that a portion of the iodine remains chemically bound after application to the skin. Any iodine in the preparation which is not released as diatomic iodine is unavailable and is of no use as far as antiseptic action is concerned. Thus, the iodophors suffer to some extent from the same disadvantages which have been observed in tincture of iodine.

It is an object of the present invention to provide an iodine preparation whose antibacterial effect on pathogenic bacterial organisms is greatly prolonged and is sustained for as long as 24 hours after application.

It is a further object of this invention to provide a new and improved iodine preparation with sustained antibacterial activity in a form readily adapted to easy and convenient application.

Another object of this invention is the provision of an effective antiseptic iodine preparation having not only a sustained action but achieving that activity with but a low concentration of iodine.

Yet another object of this invention is to provide an effective iodine preparation which can be applied without staining the skin.

A still further object of this invention is to provide an effective iodine preparation which does not cause a stinging or burning sensation when applied to tissues.

Another object of this invention is to provide an effective method of disinfecting the skin.

Other objects and the advantages of the invention will appear hereinafter.

In accordance with the present invention it has been found that a composition comprising a solution of iodine in a carboxylic acid ester containing at least 12 carbon atoms which is non-reactive with iodine forms a highly effective topical bactericidal agent having the unique and valuable property of remaining active against a wide variety of pathogenic organisms for a period of at least 24 hours after application. The iodine compositions of this invention do not irritate the skin or the tissues to which they are applied, nor do they cause any unsightly staining of the skin.

The compositions of this invention are highly effective even against the antibiotic resistant strains of organisms such as *Staphylococcus aureus*. The compositions of this invention are also highly effective and with added convenience of application when dissolved in a volatile propellant and applied topically by an aerosol spray technique.

The carboxylic acid ester in which iodine is dissolved to form iodine preparations in accordance with the present invention must be non-reactive with iodine. This property of non-reactivity with iodine is an important and significant feature of the present invention which distinguishes the compositions of this invention from the iodine compositions heretofore available, such as tincture of iodine and the various iodophors. Through use of an inert ester to solubilize the iodine, all the iodine present in these compositions is available as an active bactericidal agent and accordingly none of the iodine is present in an unavailable form by reason of its being chemically bound as a complex. The term "inert" as used in the present specification and claims is used to mean a material which is non-reactive with iodine and which does not complex. It is apparent therefore that esters which include any reactive functional radicals are not suitable for use in the present invention and therefore unsaturated esters and esters containing free hydroxyl, amino, cyano, acid and the like groups as alcohols, are excluded as solubilizing agents for use in the present invention. Since iodine reacts with water, the compositions of this invention should be substantially anhydrous.

The carboxylic acid esters used in this invention should contain at least 12 carbon atoms and are either esters of monocarboxylic acids containing 2 to 20 carbon atoms with aliphatic alcohols containing 2 to 18 carbon atoms and 1 to 3 hydroxyl groups per molecule, or esters of dicarboxylic acids containing 2 to 20 carbon atoms with monohydric alcohols containing 2 to 18 carbon atoms.

Esters of monocarboxylic acids useful in practicing this invention include ethyl stearate, butyl stearate, ethyl myristate, n-propyl myristate, isopropyl myristate, isobutyl myristate, n-hexyl myristate, isopropyl caprate, n-amyl caprate, isooctyl caprate, n-amyl caprylate, isopropyl laurate, octadecyl acetate, myristyl propionate, myristyl butyrate, myristyl acetate, cetyl propionate, the fully esterified triglycerides of myristic, lauric, palmitic and stearic acids, and the like. Useful esters of dicarboxylic acids include dioctyl sebacate, dibutyl sebacate, didecyl adipate, dioctyl adipate, didecyl succinate, dihexyl succinate, diisopropyl sebacate, dimyristyl succinate, didecyl suberate and the like.

It has been found that optimum results are obtained with the esters of monocarboxylic acids having 14 to 18 carbon atoms with the lower aliphatic alcohols, particularly those containing 2 to 4 carbon atoms. Isopropyl myristate, for example, has been found to be particularly effective.

The compositions of this invention can consist solely of a solution of iodine in an ester of the type described above, or alternately can also comprise such solution in combination with an inert volatile carrier. It has been found that the use of a volatile propellant carrier is particularly desirable since the resulting composition can be applied rapidly and uniformly over wide areas without requiring the use of cotton swabs or other means of application, which may disturb the wound being treated.

Propellants suitable for use in the present invention are preferably the aliphatic hydrocarbons or halogenated alkanes having a vapor pressure of about 5 to about 300 and preferably 20 to 70, pounds per square inch gauge at 70° F. The propellant must be completely inert in the presence of iodine, since any iodination of the propellant would result in reducing the effective iodine concentration of the preparation. The unsaturated hydrocarbons should be avoided for this reason. Suitable propellants include the aliphatic hydrocarbons, such as propane, butane, isobutane, cyclobutane, cyclopropane and the like. Useful halogenated alkanes are those which contain not more than 2 carbon atoms and at least 1 fluorine atom, the atomic weight of each substituted halogen atom not exceeding 36. Examples of these chlorofluorocarbons are dichlorodifluoromethane, trichlorotrifluoroethane, monofluorotrichloromethane, 1,1-difluoroethane, 1-chloro-1,1-difluoroethane, 1,2-dichloro-1,1,2,2-tetrafluoroethane, and the like. The propellant carrier system may also include compatible inert organic solvents for iodine such as methyl chloride, chloroform and the like to insure that the iodine is completely soluble in the carrier at the concentration of iodine used. The vapor pressure of the entire carrier system should be within the limits listed above.

The halogenated hydrocarbons, such as those listed above, are preferred since they are non-flammable, stable and are completely inert to iodine. A propellant system comprising a mixture of trichloromonofluoromethane and dichlorodifluoromethane is particularly effective.

Where the advantages of spray application are not desired, the composition of an ester and iodine can include a volatile inert carrier such as methyl chloroform which will evaporate after application of the composition to the skin leaving a solution of iodine in the ester.

The compositions of this invention contain an effective quantity of iodine for antibacterial activity, the exact concentration being determined by whether or not an inert volatile carrier is employed and the amount of the composition applied during use.

The effective thereapeutic agent constitutes the combination of iodine and the inert ester, since any carrier present is rapidly volatilized after application of the composition to the skin. It has been found that the ratio of parts by weight of the ester to parts by weight of iodine should be between 5 to 1 and about 50 to 1.

It is generally preferred for ease and uniformity of application that the combination of iodine and inert ester be formulated with an inert volatile carrier, propellant carriers of the type described above being particularly effective. Where a carrier is employed, it is preferably present in the amount of at least 85 percent by weight of the composition. Such a concentration with propellant carriers insures constant spray application whether the container is full or nearly empty. The minimum iodine concentration in the compositions is 0.05 percent by weight.

It has been found that particularly effective results are obtained with a composition comprising 0.1 to 0.2 percent by weight of iodine, 1 to 2.5 percent by weight of the inert ester and the balance propellant.

In the preparation of the novel compositions of this invention, the iodine, the ester and the carrier, of a carrier is used, are blended in the required proportions. Where a propellant carrier is used, the ingredients are mixed at a temperature sufficiently below the boiling point of the carrier at atmospheric pressure to prevent loss of the carrier by evaporation. Alternately, the iodine can be dissolved in the ester in the required proportions, the solution placed in the spray container, and then the propellant pumped in under pressure.

Where a propellant carrier is used, the preparation is packaged in a sealed pressure-tight container having a valve controlled opening. The container should be constructed of a material which is non-reactive with iodine, with glass being preferred.

For therapeutic use in skin disinfection, the compositions of this invention are applied topically to the areas to be treated. Where the composition is formulated without a carrier or with a non-propellant carrier, it is readily applied to the skin by the use of cotton swabs or by other conventional means. With the preferred compositions comprising propellant carriers, topical application is readily effected by merely holding the container over the area to be treated and opening the valve to distribute a fine spray of the composition over the area. It has been found that with the compositions of this invention comprising a propellant carrier and 0.1 to 0.2 percent by weight of iodine, a spray application of one or two seconds over an area of the skin normally covered by a spray of this type held at a distance of six to eight inches from the site of application will result in the topical application of an effective quantity of iodine.

In the clinic, the compositions of this invention are effective in the treatment of skin lesions present in various bacterial and fungal infections and of fresh abrasions and are also effective antiseptics both before and after various minor surgical procedures without causing irritation or staining of the skin.

The following examples are given in order to further illustrate the present invention:

EXAMPLE 1

A quantity of 1 gram of crystalline iodine and 10 grams of isopropyl myristate are dissolved in 989 grams of a mixture of 1 part trichloromonofluoromethane (Freon-11) and 1 part dichlorodifluoromethane (Freon-12) at a temperature of 0° F. to form a composition in which the concentration of iodine and isopropyl myristate are 4.1 and 1.0 percent by weight, respectively.

Pressure tight glass containers fitted with a valve controlled opening are each filled with 50 cc. of the solution and the containers are then ready for use.

In a similar manner, the following propellant solutions are prepared, all concentrations being expressed as percent by weight:

| Example Number | Concentration in percent by weight | | | |
|---|---|---|---|---|
| | Iodine | Alcohol | Isopropyl Myristate | Propellant |
| 2 | 0.2 | | 1.0 | 98.8 |
| 3 | 0.1 | | 2.0 | 97.9 |
| 4 | | | 1.0 | 99.0 |
| 5 | 0.1 | | | 99.9 |
| 6 | 0.1 | 3.0 | | 96.9 |
| 7 | 0.5 | | | 99.5 |
| 8 | 0.5 | 15.0 | | 84.5 |

The preparations of Examples 1 to 8 were tested for their antibacterial effect as determined by their ability to hinder the growth of the organisms *Staphylococcus aureus* (antibiotic resistant), *Escherichia coli*, *Aerobacter aerogenes*, *Proteus* sp., *Bacillus megatherium* and *Streptococ-* cus faecalis. The following test procedure was employed:

Colonies of each organism are cultured in agar overnight at 37° C. in a slanted test tube. The following morning, a portion of each culture medium is then streaked, employing a sterile cotton swab, over the surface of hardened brain heart infusion agar held in a series of 100 millimeter by 8 millimeter Petri dishes. A test group of Petri dishes containing agar streaked with each organism is provided for each preparation being tested.

One-half of each dish is covered to serve as a control and the other half is sprayed for 2 seconds with the container nozzle held 12 inches directly over the uncovered area of the dish. With the propellant mixture and nozzle used, 1 gram of the container contents is expelled and directed towards the dish.

After being sprayed, the dishes are incubated at 37° C. and examined at 8 and 24 hour intervals to determine the degree of growth of the test organisms. The results are presented in the following table. The columns headed 8 and 24 indicate the growth state of the organisms in the sprayed halves of the dishes after 8 and 24 hours of incubation, respectively. The results are expressed by the following symbols:

+ Considerable visible growth of the organisms.
± Some growth of the organisms.
− No growth of the organisms.

In all the tests the control or unsprayed half of each dish showed considerable visible growth of the organisms at both 8 and 24 hours.

*Table I*

| Example Numbers | 1 | | 2 | | 3 | | 4 | | 5 | | 6 | | 7 | | 8 | |
|---|---|---|---|---|---|---|---|---|---|---|---|---|---|---|---|---|
| Iodine Sprayed on Uncovered Half (mg.) | 1 | | 2 | | 1 | | | | 1 | | 1 | | 5 | | 5 | |
| Hours Incubated | 8 | 24 | 8 | 24 | 8 | 24 | 8 | 24 | 8 | 24 | 8 | 24 | 8 | 24 | 8 | 24 |
| Organism: | | | | | | | | | | | | | | | | |
| S. aureus | − | − | − | − | − | − | + | + | − | ± | − | ± | − | ± | − | ± |
| E. coli | − | − | − | − | − | − | + | + | − | ± | − | ± | − | ± | − | ± |
| A. aerogenes | − | − | − | − | − | − | + | + | − | ± | − | ± | − | − | − | ± |
| P. sp | − | − | − | − | − | − | + | + | − | ± | − | ± | − | ± | − | ± |
| B. megatherium | − | − | − | − | − | − | + | + | − | ± | − | ± | − | ± | − | ± |
| S. faecalis | − | − | − | − | − | − | + | + | − | ± | − | ± | − | ± | − | ± |

The results presented in the table establish the sustained effect of the compositions of this invention on the growth of the test organisms for a period of 24 hours. The results also establish that the unexpected improvement obtained with a combination of iodine with isopropyl myristate is not in any way predictable by the added activities of the individual substances. It is noted that the composition of Example 4 containing 1 percent isopropyl myristate and no iodine was entirely ineffective over either 8 or 24 hours. The composition of Example 5 containing 0.1 percent iodine and no isopropyl myristate was not effective in inhibiting growth of the organisms over 24 hours. In contrast the composition of Example 1 which contains 0.1 percent iodine and 1 percent isopropyl myristate was fully effective in inhibiting the growth of all the organisms over the full 24 hour test period.

It is further noted that the composition of Example 1 prepared in accordance with this invention and containing 0.1 percent iodine has superior properties over the 24 hour test period as compared to the composition of Example 7 which contained 5 times as much iodine but without the solubilizing agent.

The results presented in Table 1 also illustrate the ineffectiveness of compositions of iodine and ethyl alcohol which are similar therefore in some respects to tincture of iodine. Such compositions are exemplified by Examples 6 and 8, with Example 6 containing 0.1 percent iodine and 3 percent alcohol and Example 8 containing 0.5 percent iodine and 15 percent alcohol. Again it is noted that the compositions of Examples 6 and 8 were not effective over the full 24 hour test period. It is further noted that the composition of Example 8 was not even as effective as the composition of Example 7, indicating that the presence of the 15 percent by weight of alcohol in the composition of Example 7 exerted a detrimental effect on the bactericidal activity of the composition.

The following examples illustrate the preparation of other iodine compositions in accordance with this invention using esters other than isopropyl myristate. The compositions illustrated in each of the following Examples 9 through 12 are prepared in a similar manner to that described in connection with the preparation of the composition of Example 1 using the same propellant.

EXAMPLE 9

| | Percent by weight |
|---|---|
| Iodine | 0.1 |
| Butyl stearate | 1.0 |
| Propellant | 98.9 |
| | 100.0 |

EXAMPLE 10

| | |
|---|---|
| Iodine | 0.1 |
| Vegetable oil [1] | 1.0 |
| Propellant | 98.9 |
| | 100.0 |

[1] Saturated triglycerides of 18 carbon atom fatty acids.

EXAMPLE 11

| | |
|---|---|
| Iodine | 0.1 |
| Diisopropyl sebacate | 1.0 |
| Propellant | 98.9 |
| | 100.0 |

EXAMPLE 12

| | |
|---|---|
| Iodine | 0.1 |
| Cetyl propionate | 1.0 |
| Propellant | 98.9 |
| | 100.0 |

The compositions of Examples 9 to 12 were tested for their antibacterial effect as determined by their ability to hinder the growth of the organisms *Staphylococcus aureus*, *Escherichia coli*, *Aerobacter aerogenes* and *Streptococcus faecalis*. The same test procedure as that used in the test of the compositions of Examples 1 to 8 was employed. The compositions of Examples 9 to 12 were found to be fully effective in inhibiting the growth of the organisms at both 8 and 24 hours. All the organisms on the treated halves of the test dishes showed no visible growth.

EXAMPLE 13

A composition comprising 0.2 percent iodine, 1.0 percent hexylene glycol and 98.8 percent propellant is prepared in the manner described in connection with the preparation of the composition of Example 1. Hexylene glycol contains free hydroxyl groups and therefore is capable of reacting with iodine.

The compositions of Example 13 was tested against the same organisms used in the testing of the compositions of Examples 1 to 8, and it is observed that all the organisms showed some growth after 24 hours. This result indicates that a reactive material which forms an iodophor is not effective as a solubilizing agent in the present invention even at twice the iodine concentration of the effective iodine compositions of Examples 1, 3 and 9 to 12.

The effective compositions illustrated by the foregoing examples are unique in having an effective bactericidal action at a low iodine concentration. This desirable result is made possible by the fact that the iodine is present in the composition solely as diatomic iodine without the presence of any ineffective and irritating triiodide ion, as in the case of tincture of iodine, or combined as a chemical complex, as in the case of the various iodophors which have been suggested as substitutes for tincture of iodine. This uniquely low but effective iodine concentration in the preparations of this invention accounts for the non-toxic, non-irritating and non-staining properties of the preparations. It is also a feature of preparations of this invention that they possess a prolonged antibacterial activity for at least 24 hours, thereby minimizing the frequency of application of the preparation.

This application is a continuation-in-part of our copending application Serial Number 797,585, filed March 6, 1959, now abandoned.

It is understood that the foregoing detailed description is given merely by way of illustration and that many variations may be made therein without departing from the spirit of our invention.

Having described our invention, what we desire to secure by Letters Patent is:

1. An antibacterial composition for topical application consisting of the combination of iodine with an inert ester containing at least 12 carbon atoms selected from the group consisting of esters of monocarboxylic acids containing 2 to 20 carbon atoms with aliphatic alcohols containing 2 to 18 carbon atoms and 1 to 3 hydroxyl groups and esters of dicarboxylic acids containing 2 to 20 carbon atoms with monohydric alcohols containing 2 to 18 carbon atoms, the ratio by weight of said inert ester to said iodine being between 5 to 1 and 50 to 1.

2. A composition according to claim 1 wherein said inert ester is an ester of a monocarboxylic acid containing 14 to 18 carbon atoms with an aliphatic monohydric alcohol containing 2 to 4 carbon atoms.

3. A composition according to claim 1 wherein said inert ester is isopropyl myristate.

4. An antibacterial composition for topical application consisting of at least 85 percent by weight of an inert volatile carrier and a combination of iodine with an inert ester containing at least 12 carbon atoms selected from the group consisting of esters of monocarboxylic acids containing 2 to 20 carbon atoms with aliphatic alcohols containing 2 to 18 carbon atoms and 1 to 3 hydroxyl groups and esters of dicarboxylic acids containing 2 to 20 carbon atoms with monohydric alcohols containing 2 to 18 carbon atoms, the ratio by weight of said inert ester to said iodine being between 5 to 1 and 50 to 1 and the composition containing at least 0.05 percent by weight of iodine.

5. A composition according to claim 4 wherein said carrier is an inert propellant having a vapor pressure of about 5 to about 300 pounds per square inch gauge at 70° F.

6. An antibacterial composition for topical application consisting of at least 85 percent by weight of an inert propellant having a vapor pressure of 20 to 70 pounds per square inch gauge at 70° F. and a combination of iodine and an ester of a monocarboxylic acid containing 14 to 18 carbon atoms with an aliphatic monohydric alcohol containing 2 to 4 carbon atoms, the ratio by weight of said ester to said iodine being between 5 to 1 and 50 to 1 and the composition containing at least 0.05 percent by weight of iodine.

7. An antibacterial composition for topical application consisting of 0.1 to 0.2 percent by weight of iodine, 1 to 2.5 percent by weight of an inert ester containing at least 12 carbon atoms selected from the group consisting of esters of monocarboxylic acids containing 2 to 20 carbon atoms with aliphatic alcohols containing 2 to 18 carbon atoms and 1 to 3 hydroxyl groups and esters of dicarboxylic acids containing 2 to 20 carbon atoms with monohydric alcohols containing 2 to 18 carbon atoms and an inert propellant having a vapor pressure of 20 to 70 pounds per square inch gauge at 70° F.

8. A composition according to claim 7 wherein said inert ester is an ester of a monocarboxylic acid containing 14 to 18 carbon atoms with an aliphatic monohydric alcohol containing 2 to 4 carbon atoms.

9. A composition according to claim 7 wherein said inert ester is isopropyl myristate and said inert propellant is a mixture of trichloromonofluoromethane and dichlorodifluoromethane.

10. A method of disinfecting the skin with iodine characterized by freedom from staining and irritation which comprises applying to the skin a composition comprising a combination of iodine with an inert ester containing at least 12 carbon atoms selected from the group consisting of esters of monocarboxylic acids containing 2 to 20 carbon atoms with aliphatic alcohols containing 2 to 18 carbon atoms and 1 to 3 hydroxyl groups and esters of dicarboxylic acids containing 2 to 20 carbon atoms with monohydric alcohols containing 2 to 18 carbon atoms, the ratio by weight of said inert ester to said iodine being between 5 to 1 and 50 to 1.

11. A method according to claim 10 wherein said composition comprises at least 85 percent by weight of an inert volatile carrier and said composition comprises at least 0.05 percent by weight of iodine.

12. A method of disinfecting the skin with iodine characterized by freedom from staining and irritation which comprises spraying the skin with an effective amount of a composition comprising at least 85 percent by weight of an inert propellant having a vapor pressure of about 5 to about 300 pounds per square inch gauge at 70° F. and a combination of iodine with an inert ester containing at least 12 carbon atoms selected from the group consisting of esters of monocarboxylic acids containing 2 to 20 carbon atoms with aliphatic alcohols containing 2 to 18 carbon atoms and 1 to 3 hydroxyl groups and esters of dicarboxylic acids containing 2 to 20 carbon atoms with monohydric alcohols containing 2 to 18 carbon atoms, the ratio by weight of said inert ester to said iodine being between 5 to 1 and 50 to 1 and the composition containing at least 0.05 percent by weight of iodine.

13. A method according to claim 12 wherein said composition contains 0.1 to 0.2 percent by weight of iodine and 1 to 2.5 percent by weight of said inert ester.

14. A method according to claim 13 wherein said ester is isopropyl myristate.

References Cited in the file of this patent

UNITED STATES PATENTS

| | | |
|---|---|---|
| 2,498,727 | Verblen | Feb. 28, 1950 |
| 2,853,423 | La Via | Sept. 23, 1958 |

OTHER REFERENCES

Pears: Perfumery and Essential Oil Record, 44: 3, pp. 84–90 and 101, March 1953.

Technical Information, A. Boake, Roberts and Co., Ltd., Stratford, London, E. 15, recd. in Div. 43, Mar. 6, 1956, 16 pp.

Chadwick et al.: J. Soc. Cosmetic Chemists, 2: 3, pp. 105–121, November 1951.